Patented June 15, 1954

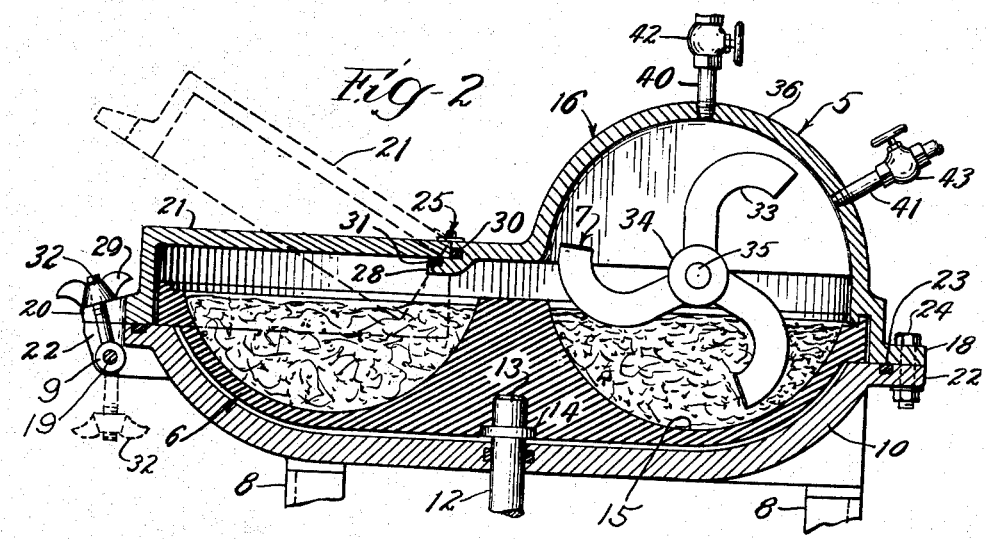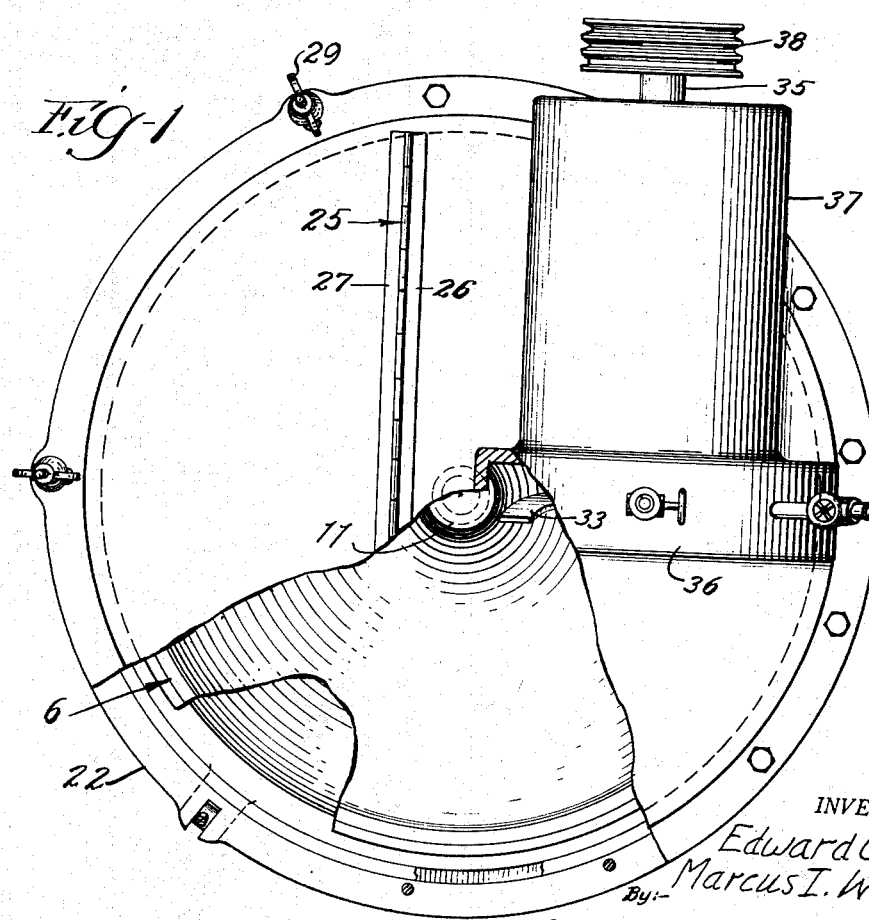

2,681,279

UNITED STATES PATENT OFFICE 2,681,279

METHOD OF PREPARING SAUSAGE

Edward C. Sloan and Marcus I. Wegner, Madison, Wis., assignors to Oscar Mayer & Co., Inc., Chicago, Ill., a corporation of Illinois Application August 3, 1950, Serial No. 177,474

4 Claims. (Cl. 99—109)

The present invention relates, generally, to improvements and innovations in comminuted meat and sausage products, and methods of preparing such products. More specifically, the invention relates to the elimination of air and oxygen and the use of nitrogen gas under controlled pressure in the preparation of sausage batter and meat products made with comminuted meat.

The tendency of products made of and with comminuted meat, such as ground meat, sausage and sausage batter, to spoil and fade in color has long been recognized and constituted a real problem in the meat industry. When meat is comminuted, the surface area exposed to the air is increased many fold on the basis of unit weight. It is known that color fading, spoilage and deterioration in flavor are due to the harmful effect of the oxidative reactions of the oxygen in the air, and an increase in the exposed or surface area of the meat results in an acceleration of these deteriorating actions.

Briefly stated, it has been found in accordance with the present invention that more stable and superior color, flavor, and keeping qualities can be obtained in sausage products, as well as other meat products comprising comminuted or ground meat, by eliminating the presence of oxygen in such meat products or maintaining the level of concentration of the oxygen below that at which it will have any substantial deteriorating effect, and including or incorporating in the comminuted meat product sufficient nitrogen so as to produce the desired improvement in texture.

Furthermore, it has been found that substantial improvement in the texture of comminuted meat products with respect to quality and uniformity can be obtained by chopping or comminuting the meat under controlled absolute pressures of nitrogen.

The object of the present invention, generally stated, is the provision of meat products made of or with ground or comminuted meat, including products made with sausage batter, and new and improved methods of making such products, which exhibit marked improvement and superiority in respect to color, flavor, and keeping qualities due to the introduction of nitrogen gas into these comminuted meat products and the elimination or reduction in the oxygen level thereof to the point where its normally deleterious effect is eliminated.

An important object of the invention is the improvement in uniformity and quality of texture of products made of or with comminuted meat by chopping or comminuting the meat under controlled negative or positive pressures.

Certain other important objects of the invention will, in part, be obvious and will, in part, appear hereinafter.

For a more complete understanding of the nature and scope of the invention, reference may now be had to the following detailed description thereof taken in connection with the accompanying drawings, wherein:

Fig. 1 is a vertical sectional view through a hooded or sealed meat cutter machine in which the present invention may be practiced; and Fig. 2 is a top plan view, partly broken away, of the apparatus shown in Fig. 1.

A present commonly used method of making sausage batter is to feed the ground or hashed ingredients into a meat comminutor of suitable type, such as a silent cutter, in which the meat is finely chopped in an uncovered rotating bowl by rapidly rotating knives. Other known types of comminuting and mixing machines may be used. In the process, besides comminuting the meat and mixing it with the other batter ingredients, the comminuting apparatus acts to incorporate or beat air into the batter. The introduction of air is, on the one hand, desirable in that it imparts a desirable texture to the sausage product, but, on the other hand, the entrapped air has an adverse effect in that the oxygen component thereof retards the formation of a "cure color" and induces the development of an objectionable gray-brown faded color, and furthermore, the oxygen promotes oxidative rancidity and aerobic bacterial growth which cause spoilage and undesirable flavors.

Color of a meat product to which curing agents, such as sodium nitrate and/or sodium nitrite have been added, involves the following reversible reaction:

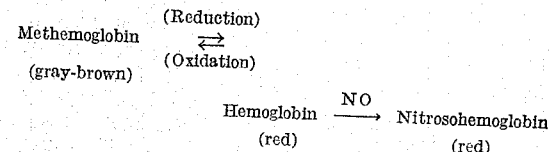

On the basis of this reversible reaction it will be seen that the presence of oxygen promotes the development of the gray-brown methemoglobin, whereas absence of oxygen and the existence of reducing conditions promote the production of nitrosohemoglobin which is red in color.

Various attempts to avoid the deleterious and degrading effects of oxygen on sausage batters have been made including the application of vacuum or a negative pressure to the batter so as to remove air therefrom. The efforts in this direction have been only partially effective, and actually detrimental in certain respects, in that application of a vacuum results in compression of the sausage batter giving it an undesirable texture and making it tough to chew.

Referring now to the drawings, one embodiment of the present invention will be described in connection therewith after which certain modifications will be described and other embodiments of the invention referred to.

In the drawings, the reference character 5 designates, generally, a meat comminutor machine of the type used for preparing sausage batter and having a rotating bowl 6 with rapidly rotating cutter knives 7. The machine 5 is mounted on a suitable frame structure which includes supporting legs 8—8. The bed 10 of the machine is dish or bowl-shaped so as to receive the rotating bowl 6. The rotating bowl 6 has a central hub portion 11 which fits over and is supported on the upper end of a drive shaft 12. The upper end 13 of the shaft 12 which carries a bowl supporting collar or flange 14 fits within an opening provided therefor in the bottom of the hub portion 11 as shown. The shaft 12 is adapted to be driven by a suitable source of power (not shown) such, for example, as an electric motor.

The bowl 6 has an annular shaped cavity 15 and is covered by a hood or cover which is indicated generally at 16. The cover 16 has a circumferential, laterally extending flange 18 on the portion thereof which remains in place on the bed 10, and for the balance of the circumference has a laterally extending flange 20 on the hinged portion 21. The flanges 18 and 20 are adapted to fit against a laterally extending circumferential flange 22 provided on the bed 10. The flange 22 is provided with an annular groove in which is seated a gasket 23.

The main portion of the cover 16 including the flange 18 is permanently bolted to the base 10 by a series of bolts 24—24 which pass through the mating flanges 18 and 22 as shown, for example, in Fig. 2. The hinged portion 21 of the cover 16 is connected to the main portion thereof by means of an elongated hinge 25, one section 26 of which is fastened to the stationary portion of the cover and the other section 27 of which is fastened to the hinged cover portion 21. The stationary cover portion has a longitudinal shelf 28 which extends underneath the adjacent edge of the hinged cover portion 21 and the hinged joint is sealed by means of two longitudinal gaskets 30 and 31 carried in grooves provided therefor as shown in Fig. 2.

In order that the hinged portion 21 may be conveniently opened and closed, a plurality of quick opening and closing clamps 32—32 are provided in the form of bolts having eyes 9 by which the bolts are swingably connected to pins 19 provided therefor on the bed 10. The bolts fit in registering slots formed therefor in the flanges 22 and 20 and may be tightened in place by wing nuts 29. When the machine is to be opened, the wing nuts are loosened and the clamps 32 swung down out of the slots as shown in broken line in Fig. 2.

The cutter knives 7 include three blades 33—33 and they are supported from a central hub 34 which is mounted on a drive shaft 35. The portion of the cover 16 which houses the cutter knives 7 is designated at 36 and is integrally formed with the remainder of the cover including a housing portion 37 (Fig. 1) from the outer end of which the shaft 35 projects and on which is mounted a drive pulley 38. The casing 36 for the cutter knife 7 is provided with two connections 40 and 41 communicating with the interior of the casing 36 and the interior of the machine 5 when closed. The connections 40 and 41 may be provided with check valves 42 and 43, respectively. The connection 40 serves as a vacuum connection for withdrawing air from the interior of the machine after it has been loaded and sealed, and the connection 41 serves as an inlet connection for the introduction of nitrogen under controlled or regulated pressure.

In preparing sausage batter in accordance with the present invention using the comminuting machine 5 described above and shown in the accompanying drawings, the rotating bowl 6 is loaded with ground or chopped meat together with the other ingredients comprising the sausage formula. The hinged portion 21 of the cover 16 is closed and clamped in sealing engagement and negative pressure is applied to the interior of the machine by opening the valve 42 connected with a source of vacuum. A more complete and rapid removal of the entrapped air or oxygen is obtained if the machine is in operation at this time so that the bowl 6 is rotating and the cutter knives 7 are rapidly rotated. After the entrapped air has been removed, the vacuum is broken by closing the valve 42 and introducing nitrogen under pressure by opening the check valve 43. The nitrogen gas in the hooded machine enters into any voids and openings within the batter and is also thoroughly incorporated therein as the chopping operation is carried out.

While the nitrogen inlet could be located at any one of several different locations, it is preferably placed in the position shown in the housing portion 36 for the rotating knives 7 in order that the stream of nitrogen is directed into the cutting knives 7 and thereby carried and chopped directly into the batter. Additional nitrogen inlets may be provided if desired. Likewise, the location of the vacuum connection 40 in the casing portion 36 tends to give a greater effectiveness to the vacuum in removing the entrapped air due to the continuous agitation of the batter by the rotating cutter knives 7. Additional vacuum connections may be added if the need arises.

The exact operating conditions will depend upon such factors as type of meat product being comminuted and the particular comminuting apparatus being used. Thus, the percentage volume of nitrogen to be entrapped will vary with different products and will even vary with different styles of the same product. For example, wieners will normally contain approximately 12% by volume of nitrogen but certain styles of weiners will contain only 8% by volume of nitrogen. In general, an increase in nitrogen pressure will result in an increase in entrapped nitrogen incorporated into a comminuted meat product, other conditions remaining the same. Similarly, an increase in chopping time will also increase the nitrogen content of the product. However, the chopping time is often fixed by other conditions and is not subject to variation. Accordingly, pressure control will be normally used to obtain the proper nitrogen content. The nitrogen pressure may range from a few pounds absolute, e. g. five, up to superatmospheric pressure, e. g. 30 pounds per square inch absolute.

After a batch of sausage batter has been prepared in the comminuting machine or mixer 5, the valve 43 is closed so as to shut off the nitrogen pressure prior to opening of the hinged portion 21 of the cover. If desired, a pressure relief valve may be provided so as to relieve any superatmospheric pressure which remains within the machine 5 after a batch is finished.

It will be appreciated that the improved process of the present invention may be carried out in other types and styles of comminuting or cutting machines than the one shown in the drawings and described. In fact, any standard or conventional type machine which now may be used for this purpose can be modified for the practice of the present invention by enclosing the machine in a suitable manner so that a positive pressure of nitrogen may be applied thereto after the machine has been evacuated.

While the invention has been described particularly in connection with sausage batter and sausage products, it will be understood that it has application to other products made of or with comminuted meat. For example, the advantages provided by the invention can be used to improve such fresh meat products as hamburger, ground steak, meat loaf, etc.

Meat products comminuted in accordance with the present invention, including such items as wiener sausage, bologna sausage, liver sausage, and other sausage products, are superior to the same meat products comminuted in conventional or known manner in respect to color, flavor, keeping qualities, and texture. In order that the fullest advantage can be gained from the present invention, the comminuted meat products made in accordance therewith should be protected from the air by subsequently handling and packaging in an inert atmosphere such as nitrogen.

Having fully described and illustrated the invention and certain preferred embodiments thereof, what is claimed as new is:

1. The improvement in preparing meat products which comprises placing a negative pressure on the meat so as to remove entrapped air and oxygen therefrom and thereafter introducing nitrogen into the meat and comminuting the meat in said atmosphere of nitrogen.

2. The improvement in comminuting meat called for in claim 1 which comprises chopping the meat in an atmosphere of nitrogen under superatmospheric pressure.

3. The improvement in comminuting meat called for in claim 1 which comprises chopping the meat in an atmosphere of nitrogen under subatmospheric pressure.

4. The improvement in the preparation of sausage batter which comprises placing a negatives pressure on the batter so as to remove entrapped air and oxygen therefrom and thereafter introducing nitrogen into the batter and mixing the sausage batter in said atmosphere of nitrogen.

References Cited in the file of this patent

UNITED STATES PATENTS

| Number | Name | Date |
| --- | --- | --- |
| 91,552 | Lyman | June 22, 1869 |
| 1,863,355 | Schibsted | June 14, 1932 |
| 1,945,669 | Vogt | Feb. 6, 1934 |
| 1,992,566 | Tone | Feb. 26, 1935 |
| 2,147,261 | Lewis | Feb. 14, 1939 |
| 2,230,062 | Jordan | Jan. 28, 1941 |
| 2,266,877 | Lindberg et al. | Dec. 23, 1941 |
| 2,318,178 | McKinnis | May 4, 1943 |
| 2,425,912 | Appel et al. | Aug. 19, 1947 |

FOREIGN PATENTS

| Number | Country | Date |
| --- | --- | --- |
| 16,362 of 1890 | Great Britain | Dec. 6, 1890 |